Patented May 23, 1939

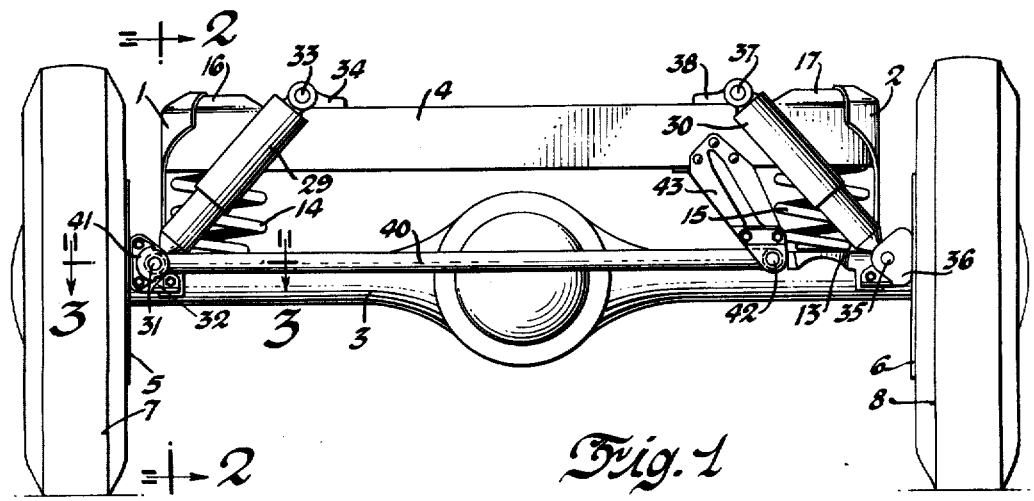

2,159,203

UNITED STATES PATENT OFFICE 2,159,203

SPRING SUSPENSION

Charles A. Chayne, Flint, Mich., assignor to General Motors Corporation, Detroit, Mich., a corporation of Delaware Application January 6, 1938, Serial No. 183,642

5 Claims. (Cl. 267—66)

This invention relates to a vehicle having a conventional axle carrying road wheels on opposite sides of the vehicle, in which the spring means has the single function of resiliently resisting upward motion of the axle relatively to the frame.

It especially concerns a motor vehicle in which upward movement of the rear axle relatively to the vehicle frame is directly resisted by coil springs, there being means separate from the spring for controlling movement of the axle longitudinally and transversely of the vehicle. One object of the invention is a construction in which movement of the axle transversely of the vehicle is controlled by a transverse radius rod of maximum length, to reduce to a minimum the transverse movement of the axle relatively to the vehicle frame.

Another object of the invention is a construction in which the vehicle frame terminates immediately above the axle, the body of the vehicle extending therebeyond as may be desired.

A further object of the invention is an advantageous disposition of direct acting hydraulic shock absorbers between the axle and the vehicle frame.

The above and other objects of the invention will be apparent as the description proceeds.

According to the invention the radius rod arranged transversely of the vehicle to control movement of the axle transversely of the frame has one end pivotally connected to the brake backing plate on one side of the vehicle and its other end is pivotally connected to the vehicle frame at a point towards the opposite side of the vehicle, as far removed as possible from its pivotal connection to the brake backing plate.

The direct acting shock absorbers between the vehicle frame and each end of the axle, are arranged with their lines of action downwardly divergent transversely of the vehicle from pivot axes on the vehicle frame to pivot axes on the brake backing plates, spaced as far apart as possible, to give the shock absorbers increased mechanical advantage in the work they have to perform.

The drawings show the application of the invention to a torque tube drive rear axle of a motor vehicle.

In the drawings

Fig. 1 is a rear elevation of the vehicle chassis.

Fig. 2 is a view on line 2—2 of Fig. 1.

Fig. 3 is an enlarged view on line 3—3 of Fig. 1.

Figure 4:
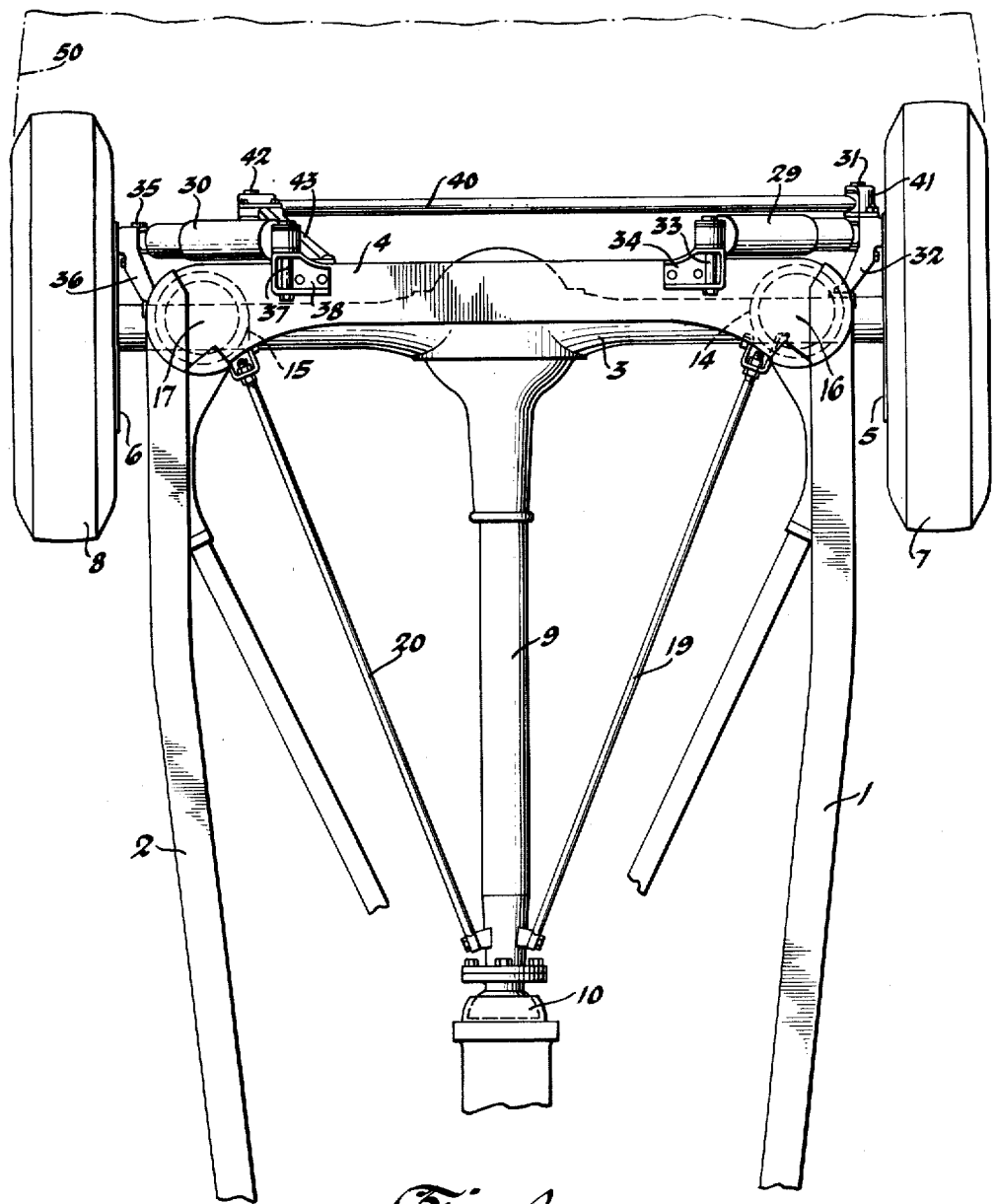
Fig. 4 is a plan view of the rear end of the vehicle chassis.

The vehicle frame has side members 1 and 2 which are upswept above the rear axle housing 3 and terminate immediately above the rear axle housing, where there is a transverse member 4.

The rear axle housing 3 is provided with brake backing plates 5 and 6, and supports driven rear wheels 7 and 8. Its movement longitudinally of the frame is controlled by the torque tube 9, which is pivotally connected to the vehicle frame through a ball joint 10 in the usual and well known manner, and takes both the driving torque reaction and the driving thrust of the road wheels.

On top of the axle housing 3 and towards the ends thereof are brackets such as 12 and 13 forming spring seats for coil springs 14 and 15 respectively. The upper ends of the springs 14 and 15 have seatings 16 and 17 formed in pockets at the juncture of each of the side members 1 and 2 and the transverse member 4.

Strut rods 19 and 20 extend from the torque tube 9 to the brackets 12 and 13.

A pair of direct acting hydraulic shock absorbers 29 and 30 of well known type are operative between the axle housing 3 and the vehicle frame. The shock absorber 29 has one end pivotally connected to a pivot pin 31 on a bracket 32 attached to the brake backing plate 5 and extending between the brake backing plate 5 and the rear axle housing 3. The shock absorber 30 has one end similarly connected to a pivot pin 35 on a bracket 36 attached to the brake backing plate 6 and extending between the brake backing plate 6 and the rear axle housing 3. The other ends of the shock absorbers 29 and 30 are pivotally connected to pivot pins 33 and 37 respectively on brackets 34 and 38 on the crossmember 4.

The pivot pins 31, 33, 35 and 37 are substantially horizontal and parallel to each other longitudinally of the vehicle, in the normal position of the parts. There are eyes at each end of the shock absorbers provided with rubber bushings such as 39 of well known type, which frictionally grip both the eyes and the pivot pins on which they are mounted to provide for a degree of universal movement as well as pivotal movement of the shock absorbers.

Movement of the axle transversely of the frame is controlled by a transverse radius rod 40. The transverse tubular radius rod 40 has one end pivotally connected to the pivot pin 31 which is longer than the pivot pin 35 to permit of this connection and is provided with an additional supporting bracket 41 bolted to the bracket 32. The other end of the radius rod is pivotally connected to a pivot pin 42 on a bracket 43 on the frame crossmember 3 towards the opposite side of the vehicle from the bracket 32.

The pivot pin 42 is substantially horizontal and parallel to the pivot pin 31 in the normal position of the parts. The radius rod has eyes at each end provided with rubber bushings such as 44, similar to the rubber bushings such as 39 for the shock absorbers, to provide for a degree of universal movement as well as pivotal movement of the radius rod, about the pivot axes 31 and 42.

As shown in dot and dash lines in Figs. 2 and 4, it is intended that the body 50 of the vehicle will extend a considerable distance to the rear of the frame terminal transverse member 4 to accommodate a spare wheel 51 and a gas tank 52.

I claim:

1. In a motor vehicle, in combination, a frame, an axle carrying brake backing plates for road wheels on opposite sides of the vehicle, a transverse member of the frame above the axle, spring means between the axle and the frame, diagonal bracing brackets secured between points spaced from each other on the axle and each of the brake backing plates respectively, direct acting shock absorbers pivotally connected to longitudinally disposed pivot pins on the said brackets and the transverse member respectively, and a radius rod arranged transversely of the vehicle to control movement of the axle transversely of the frame, said radius rod having one end pivotally connected to the transverse member towards one side of the vehicle and its other end pivotally connected to the bracket between the axle and the braking plate of the wheel on the opposite side of the vehicle.

2. The combination according to claim 1, in which the spring means comprises a pair of coil springs between seatings on each end of the axle and seatings in pockets formed at the ends of the transverse member.

3. The combination according to claim 1, in which the brackets and the shock absorbers are to the rear of the axle and the radius rod is to the rear of the shock absorbers.

4. The combination according to claim 1, in which the pivot pin on the brake bracket to which the radius rod is connected is common to the radius rod and the shock absorber connected to that bracket.

5. In a motor vehicle, in combination, a frame, a rear axle carrying brake backing plates for road wheels on opposite sides of the vehicle, said frame terminating in a transverse member above the axle, coil spring means capable only of resiliently resisting upward movement of the axle relatively between the axle and the said transverse member of the frame, diagonal bracing brackets horizontally disposed and rigidly secured between points spaced from each other on the axle and each of the brake backing plates respectively, means controlling movement of the axle longitudinally of the frame, a radius rod arranged transversely of the vehicle to control movement of the axle transversely of the frame, said radius rod having one end pivotally connected to the transverse member towards one side of the vehicle and its other end pivotally connected to the bracket between the rear axle and the backing plate of the wheel on the opposite side of the vehicle, and direct acting shock absorbers pivotally connected to the transverse member and the brackets on opposite sides of the vehicle.

CHARLES A. CHAYNE.

---

CERTIFICATE OF CORRECTION.

Patent No. 2,159,203.          May 23, 1939.

CHARLES A. CHAYNE.

It is hereby certified that error appears in the printed specification of the above numbered patent requiring correction as follows: Page 2, first column, line 35, claim 1, for "braking" read backing; and second column, line 9, claim 4, strike out the word "brake"; lines 17, 18, and 19, strike out "capable only of resiliently resisting upward movement of the axle relatively; and that the said Letters Patent should be read with this correction therein that the same may conform to the record of the case in the Patent Office.

Signed and sealed this 25th day of July, A. D. 1939.

(Seal)
Henry Van Arsdale,
Acting Commissioner of Patents.

frame crossmember 3 towards the opposite side of the vehicle from the bracket 32.

The pivot pin 42 is substantially horizontal and parallel to the pivot pin 31 in the normal position of the parts. The radius rod has eyes at each end provided with rubber bushings such as 44, similar to the rubber bushings such as 39 for the shock absorbers, to provide for a degree of universal movement as well as pivotal movement of the radius rod, about the pivot axes 31 and 42.

As shown in dot and dash lines in Figs. 2 and 4, it is intended that the body 50 of the vehicle will extend a considerable distance to the rear of the frame terminal transverse member 4 to accommodate a spare wheel 51 and a gas tank 52.

I claim:

1. In a motor vehicle, in combination, a frame, an axle carrying brake backing plates for road wheels on opposite sides of the vehicle, a transverse member of the frame above the axle, spring means between the axle and the frame, diagonal bracing brackets secured between points spaced from each other on the axle and each of the brake backing plates respectively, direct acting shock absorbers pivotally connected to longitudinally disposed pivot pins on the said brackets and the transverse member respectively, and a radius rod arranged transversely of the vehicle to control movement of the axle transversely of the frame, said radius rod having one end pivotally connected to the transverse member towards one side of the vehicle and its other end pivotally connected to the bracket between the axle and the braking plate of the wheel on the opposite side of the vehicle.

2. The combination according to claim 1, in which the spring means comprises a pair of coil springs between seatings on each end of the axle and seatings in pockets formed at the ends of the transverse member.

3. The combination according to claim 1, in which the brackets and the shock absorbers are to the rear of the axle and the radius rod is to the rear of the shock absorbers.

4. The combination according to claim 1, in which the pivot pin on the brake bracket to which the radius rod is connected is common to the radius rod and the shock absorber connected to that bracket.

5. In a motor vehicle, in combination, a frame, a rear axle carrying brake backing plates for road wheels on opposite sides of the vehicle, said frame terminating in a transverse member above the axle, coil spring means capable only of resiliently resisting upward movement of the axle relatively between the axle and the said transverse member of the frame, diagonal bracing brackets horizontally disposed and rigidly secured between points spaced from each other on the axle and each of the brake backing plates respectively, means controlling movement of the axle longitudinally of the frame, a radius rod arranged transversely of the vehicle to control movement of the axle transversely of the frame, said radius rod having one end pivotally connected to the transverse member towards one side of the vehicle and its other end pivotally connected to the bracket between the rear axle and the backing plate of the wheel on the opposite side of the vehicle, and direct acting shock absorbers pivotally connected to the transverse member and the brackets on opposite sides of the vehicle.

CHARLES A. CHAYNE.

---

CERTIFICATE OF CORRECTION.

Patent No. 2,159,203.  May 23, 1939.

CHARLES A. CHAYNE.

It is hereby certified that error appears in the printed specification of the above numbered patent requiring correction as follows: Page 2, first column, line 35, claim 1, for "braking" read backing; and second column, line 9, claim 4, strike out the word "brake"; lines 17, 18, and 19, strike out "capable only of resiliently resisting upward movement of the axle relatively; and that the said Letters Patent should be read with this correction therein that the same may conform to the record of the case in the Patent Office.

Signed and sealed this 25th day of July, A. D. 1939.

(Seal)

Henry Van Arsdale,
Acting Commissioner of Patents.